United States Patent
Mooney et al.

(10) Patent No.: US 9,312,908 B2
(45) Date of Patent: Apr. 12, 2016

(54) UNIVERSAL IO CONNECTOR AND INTERFACE CAPABLE OF BOTH WIRED AND WIRELESS OPERATION

(75) Inventors: Stephen R. Mooney, Mapleton, UT (US); Howard L. Heck, Hillsboro, OR (US); James E. Jaussi, Hillsboro, OR (US); Bryan K. Casper, Portland, OR (US); Debabani Choudhury, Thousand Oaks, CA (US); Frank T. Hady, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/995,592

(22) PCT Filed: Nov. 11, 2011

(86) PCT No.: PCT/US2011/060376
§ 371 (c)(1),
(2), (4) Date: May 12, 2014

(87) PCT Pub. No.: WO2013/070239
PCT Pub. Date: May 16, 2013

(65) Prior Publication Data
US 2014/0242927 A1 Aug. 28, 2014

(51) Int. Cl.
*H04B 1/38* (2015.01)
*H04B 1/40* (2015.01)
*G06F 13/40* (2006.01)

(52) U.S. Cl.
CPC ............. *H04B 1/40* (2013.01); *G06F 13/4068* (2013.01); *G06F 2213/0042* (2013.01)

(58) Field of Classification Search
CPC .............. H04W 76/005; H04W 4/10; H04W 29/06217; H04W 29/06442; H04W 88/02; H04B 1/38; H04M 1/72519; H04M 1/72522; H04M 1/0214
USPC ..................... 455/90.2, 90.3, 550.1
See application file for complete search history.

(56) References Cited

U.S. PATENT DOCUMENTS

| 2003/0085808 | A1 | 5/2003 | Goldberg |
| 2006/0025102 | A1 | 2/2006 | Kipnis et al. |
| 2006/0105748 | A1 | 5/2006 | Ooi et al. |
| 2007/0090921 | A1* | 4/2007 | Fisher .......................... 340/5.73 |

(Continued)

FOREIGN PATENT DOCUMENTS

| CN | 101232720 A | 7/2008 |
| TW | 200535865 A | 11/2005 |

(Continued)

OTHER PUBLICATIONS

Office Action received for Taiwanese Patent Application No. 101141007, mailed on Jun. 11, 2014, 44 pages of Office Action including 25 pages of English Translation.

(Continued)

*Primary Examiner* — Nhan Le
(74) *Attorney, Agent, or Firm* — Jordan IP Law, LLC

(57) ABSTRACT

Systems and methods of interconnecting devices may include a connector assembly having a substrate, a set of input/output (IO) contacts, an antenna structure and transceiver logic. In one example, the transceiver logic may process one or more IO signals associated with the antenna structure and process one or more IO signals associated with the set of IO contacts.

36 Claims, 4 Drawing Sheets

(56) References Cited

U.S. PATENT DOCUMENTS

2007/0213096 A1* 9/2007 Bella et al. .................. 455/558
2008/0136716 A1* 6/2008 Annamaa et al. ............ 343/702
2011/0286703 A1   11/2011 Kishima et al.

FOREIGN PATENT DOCUMENTS

| TW | 200922006 A | 5/2009 |
| TW | 200924122 A | 6/2009 |
| TW | 200929684 A | 7/2009 |
| WO | 2013/070239 A1 | 5/2013 |

OTHER PUBLICATIONS

International Preliminary Report on Patentability and Written Opinion received for PCT Patent Application No. PCT/US2011/060376, mailed on May 22, 2014, 6 pages.

International Search Report and Written Opinion received for PCT application No. PCT/US2011/060376, mailed on Jul. 16, 2012, 8 pages.

* cited by examiner

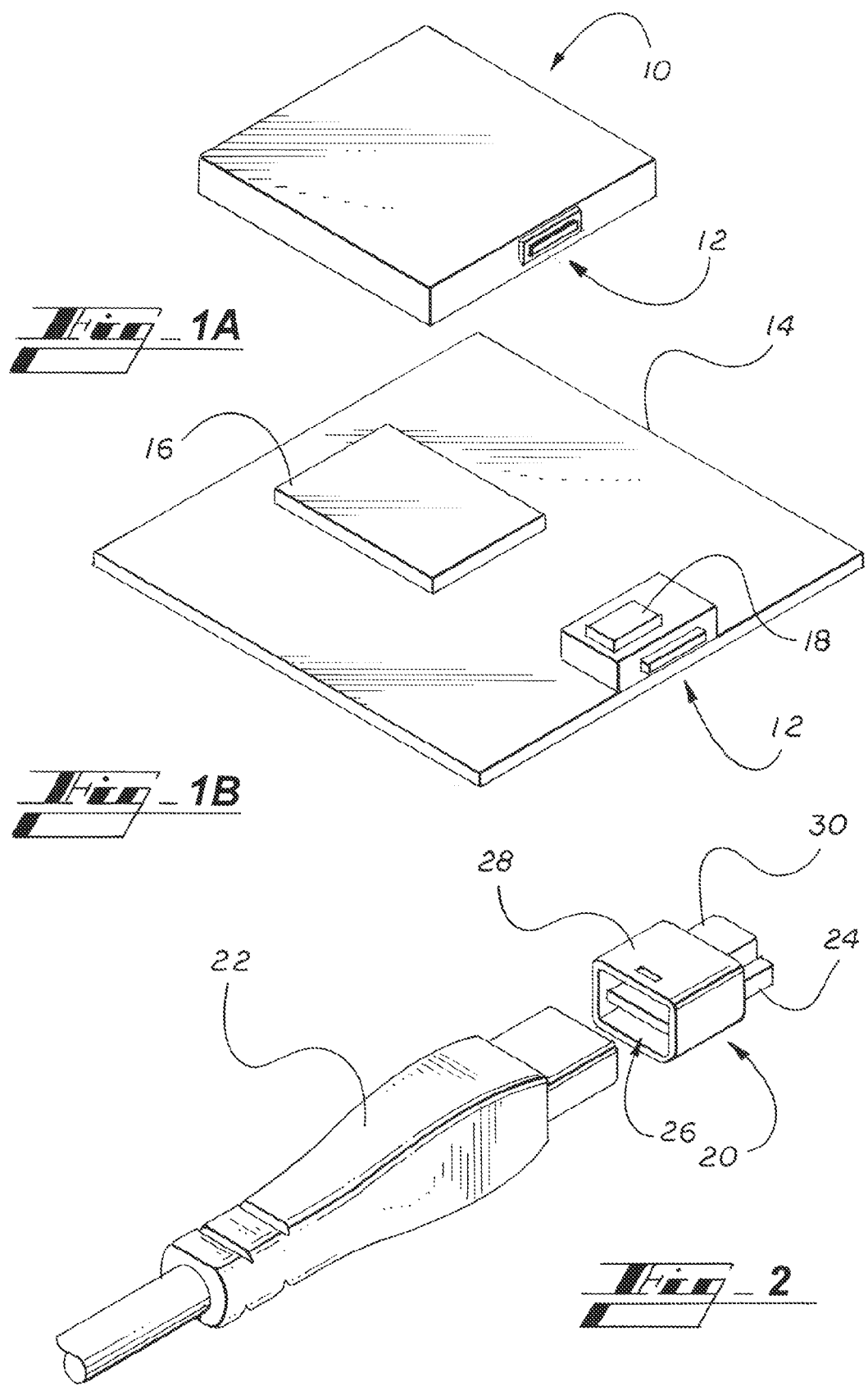

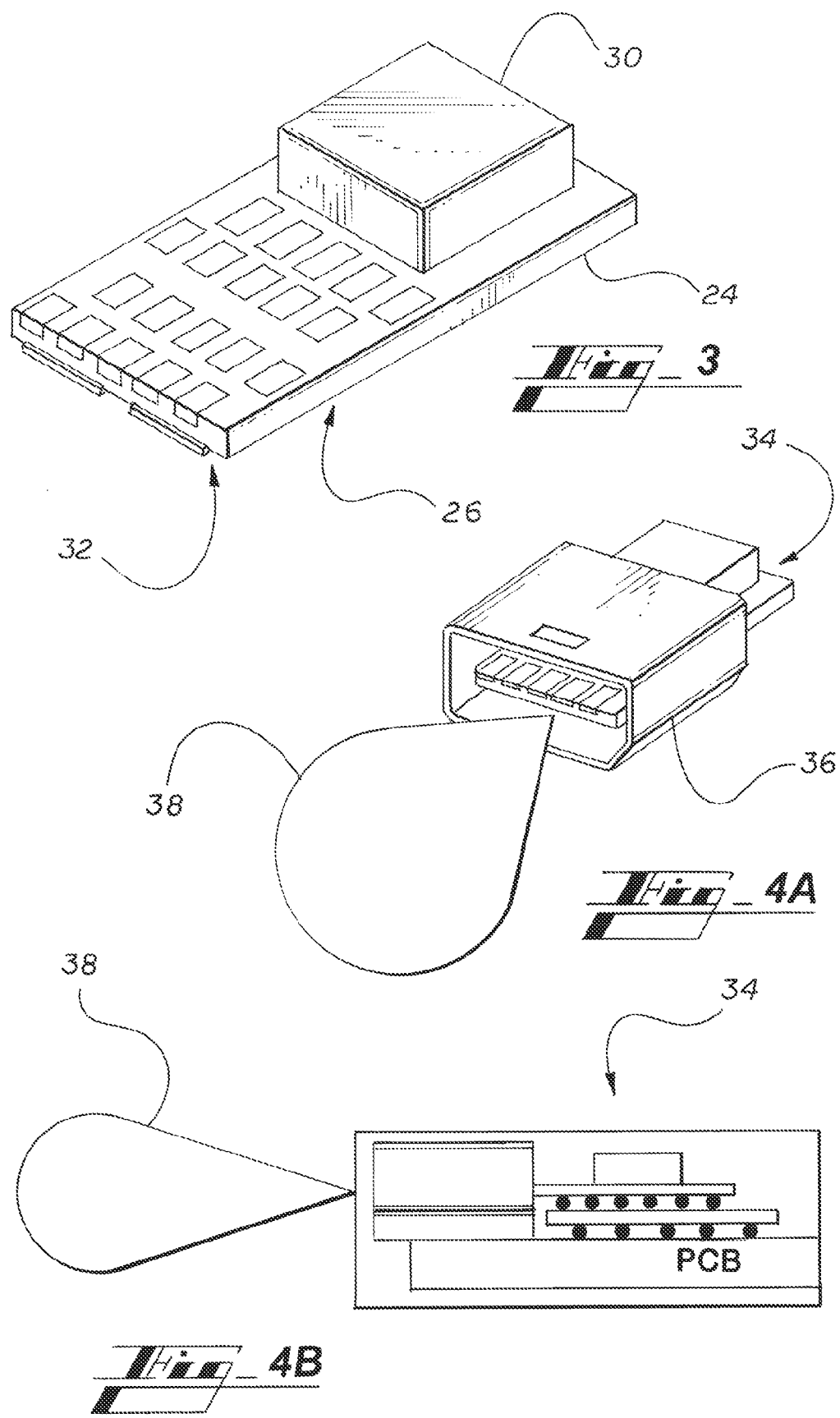

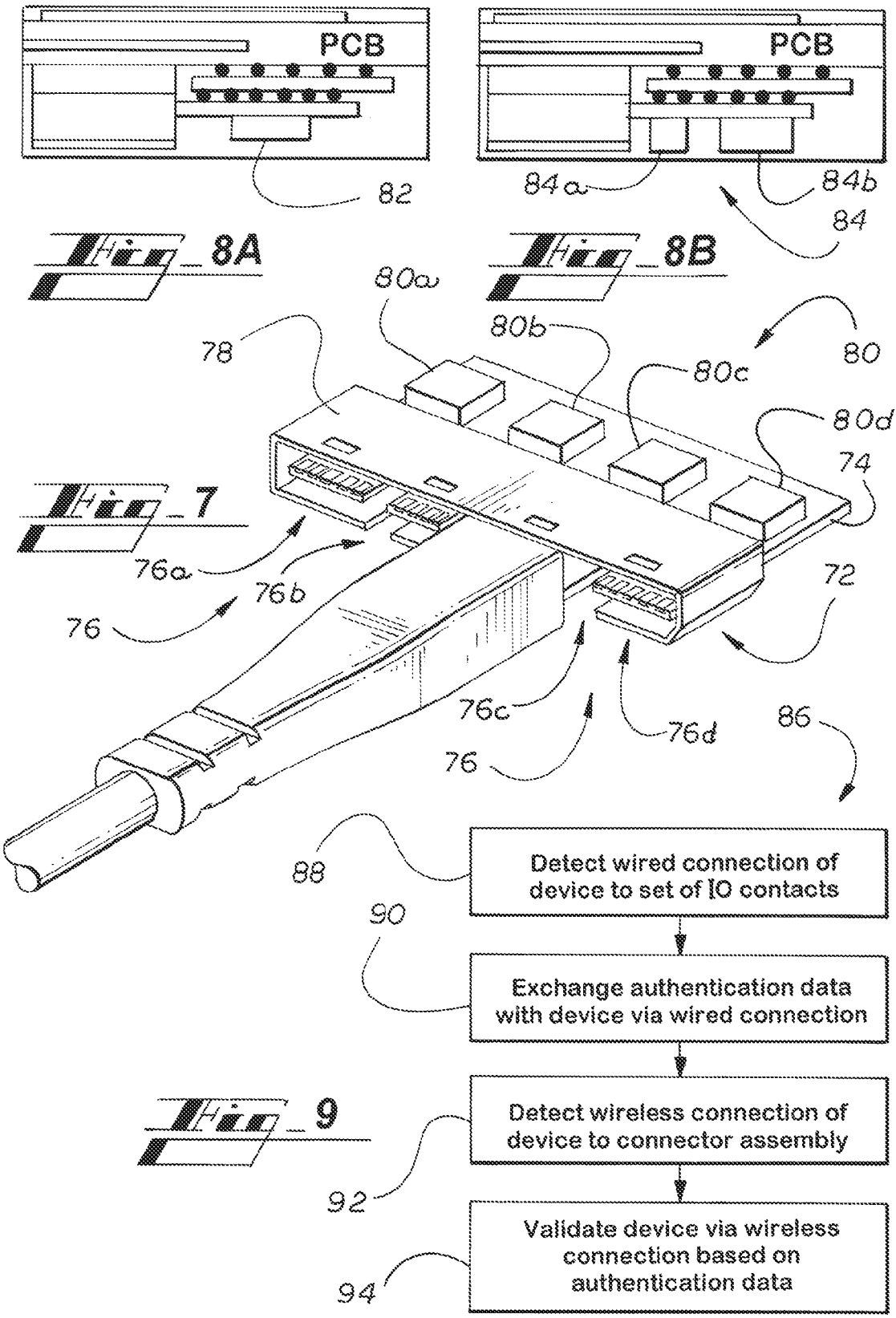

UNIVERSAL IO CONNECTOR AND INTERFACE CAPABLE OF BOTH WIRED AND WIRELESS OPERATION

BACKGROUND

1. Technical Field

Embodiments generally relate to input/output (IO) interfaces. More particularly, embodiments relate to an IO connector configuration that enables both wired and wireless operation.

2. Discussion

Computing systems may include one or more USB (Universal Serial Bus, e.g., USB Specification 2.0, USB Implementers Forum) ports to support IO communication with peripheral components such as keyboards, mice, cameras, and so forth. A typical USB port may be limited, however, to wired communication with the peripheral component in question unless a separate wireless adaptor is employed, wherein the wireless adaptor maintains a wired connection with the USB port.

BRIEF DESCRIPTION OF THE DRAWINGS

The various advantages of the embodiments of the present invention will become apparent to one skilled in the art by reading the following specification and appended claims, and by referencing the following drawings, in which:

FIG. 1A is a perspective view of an example of a computing system having an input/output (IO) connector assembly according to an embodiment;

FIG. 1B is an enlarged perspective view of an example of a computing system circuit board having an IO connector assembly according to an embodiment;

FIG. 2 is a perspective view of an example of a wired connection between a device and an IO connector assembly according to an embodiment;

FIG. 3 is a perspective view of an example of an IO connector substrate according to an embodiment;

FIG. 4A is a perspective view of an example of a connector housing that functions as an antenna according an embodiment;

FIG. 4B is a side view of the connector housing shown in FIG. 4A;

FIG. 7 is a perspective view of an example of a substrate that includes multiple sets of IO contacts according to an embodiment;

FIG. 8A is a side view of an example of transceiver logic that is incorporated into a single semiconductor package according to an embodiment;

FIG. 8B is a side view of an example of transceiver logic that is incorporated into multiple semiconductor packages according to an embodiment; and FIG. 9 is a flowchart of an example of a method of authenticating a peripheral device according to an embodiment.

DETAILED DESCRIPTION

Figure 5:
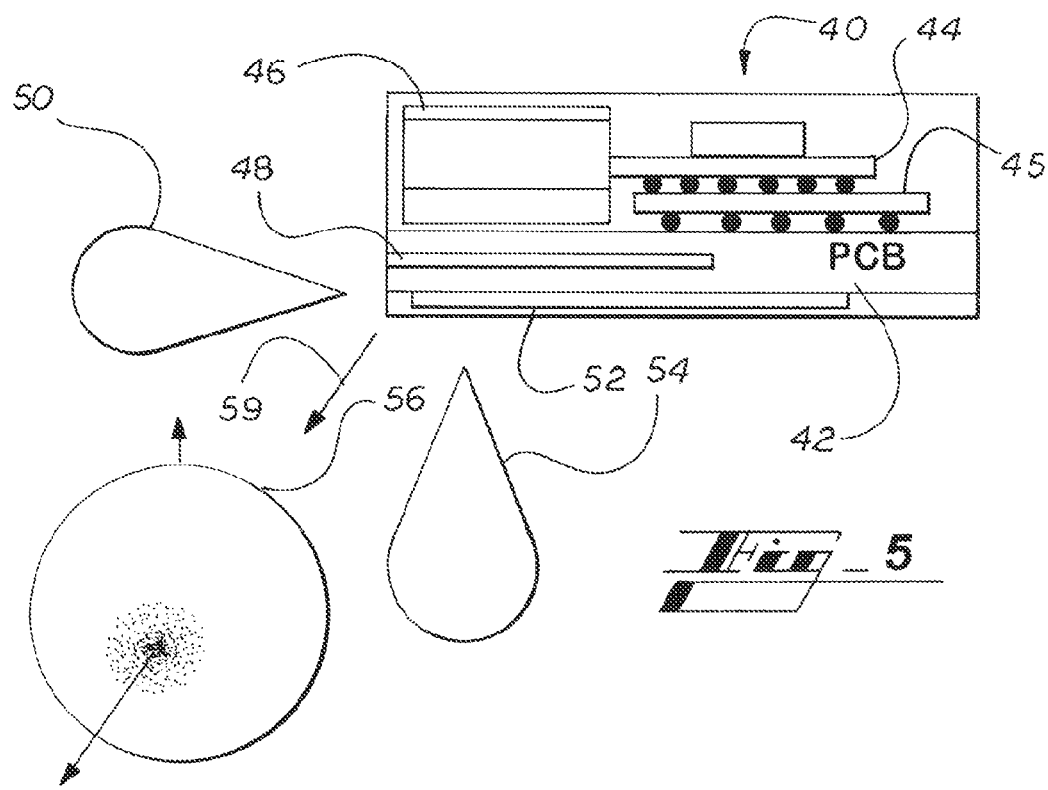
FIG. 5 is a side view of an example of an antenna structure that is integral to a bottom-facing circuit board according to an embodiment.

Embodiments may include a connector assembly having a substrate, a set of input/output (IO) contacts, an antenna structure and transceiver logic. The transceiver logic may be configured to process one or more IO signals associated with the antenna structure, and to process one or more IO signals associated with the set of IO contacts.

Embodiments may also include a system having a circuit board, a chipset component coupled to the circuit board, and a connector assembly coupled to the circuit board. The connector assembly can include a substrate, a set of IO contacts, an antenna structure and transceiver logic configured to process one or more IO signals associated with the antenna structure, and to process one or more IO signals associated with the set of IO contacts.

Other embodiments can include a computer implemented method in which one or more IO signals associated with an antenna structure of a connector assembly are processed. The method may also involve processing one or more IO signals associated with a set of IO contacts of the connector assembly.

In addition, embodiments may include a computer readable storage medium having a set of instructions which, if executed by a processor, causes a connector assembly to process one or more IO signals associated with an antenna structure of the connector assembly. The instructions can also cause the connector assembly to process one or more IO signals associated with a set of IO contacts of the connector assembly.

Turning now to FIGS. 1A and 1B, a computing system 10 is shown in which a connector assembly 12 is able to process both wired and wireless IO signals. Moreover, the wireless IO signals may be processed simultaneously and separate from the wired IO signals. As will be discussed in greater detail, the illustrated connector assembly 12 includes a set of IO contacts configured to receive and transmit wired IO signals, as well as an antenna assembly that is configured to receive and transmit wireless IO signals. The computing system 10 may include a circuit board (e.g., motherboard) 14 having a chipset component 16 such as a processor and/or platform controller hub (PCH), and the connector assembly 12 mounted thereon. In one example, the connector assembly 12 includes a buffer IC (integrated circuit) 18 that provides for buffering signals to and from the chipset component 16, as appropriate depending upon the circumstances. While the illustrated computing system 10 has a laptop form factor, other types of computing systems may also benefit from the techniques described herein. For example, the system 10 could be part of a mobile device such as a personal digital assistant (PDA), mobile Internet device (MID), wireless smart phone, media player, imaging device, smart tablet, etc., or any combination thereof. The system 10 could alternatively include a fixed platform such as a desktop personal computer (PC) or a server.

FIG. 2 shows a wired connection between a connector assembly 20 and a peripheral device (not shown) having a cable 22 configured to mate with the connector assembly 20. The mating arrangement (e.g., key shape) and underlying signaling protocol may be in accordance with, for example, USB technology, DisplayPort (DP, e.g., Embedded DisplayPort Standard (eDP) Version 1.3, January 2011, Video Electronics Standards Association) technology, High-Definition Multimedia Interface (HDMI, e.g., HDMI Specification, Ver. 1.3a, Nov. 10, 2006, HDMI Licensing, LLC) technology, Thunderbolt (e.g., Thunderbolt™ Technology: The Transformational PC I/O, 2011, Intel Corporation) technology, Peripheral Components Interconnect Express (PCI-e, e.g., PCI Express x16 Graphics 150W-ATX Specification 1.0, PCI Special Interest Group) technology, and so forth. In the illustrated example, the connector assembly 20 has a housing 28 and a substrate (e.g., and/or interposer) 24 with a set of IO contacts 26 disposed within the housing 28. The connector assembly 20 may also include a transceiver logic semiconductor package 30 mounted to the substrate 24. As will be discussed in greater detail, the housing 28 may be constructed of a metal material/alloy and function as an antenna capable of transmitting and receiving wireless IO signals. Alternatively, the antenna may be integral and/or adjacent to the substrate 24 or other circuit board such as circuit board 14 (FIG. 1).

FIG. 3 shows an enlarged view of a portion of the connector assembly 20 (FIG. 2). In the illustrated example, the IO contacts 26 are coupled to the top side of the substrate 24 and one or more power/ground contacts 32 are coupled to the bottom side of the substrate 24. The general width of the connector substrate 24 could be on the order of a few millimeters (e.g., 4.48 mm), wherein the wavelength of the IO signals being processed may also be on the order of a few millimeters or less. In this regard, silicon-based RF-CMOS (radio frequency-complementary metal oxide semiconductor) transceiver circuits may have been demonstrated for signaling frequencies up to 122 GHz in research environments, and 60 GHz CMOS-based radio systems may be in development as products for wireless applications. Accordingly, RF-CMOS-based technology advancements may support low-cost higher millimeter-wave (mm-wave) frequency, radio applications within small form-factor platforms. Moreover, as wireless technology increases in speed, the volume requirement for antenna structures may also decrease. Simply put, at millimeter-wave frequencies, antenna volume requirements can become small enough to be integrated into the package and housing of small electrical connectors.

Turning now to FIGS. 4A and 4B, a connector assembly 34 is shown in which the metal housing 36 of the connector assembly 34 functions as an antenna. In the illustrated example, the width and height of the housing 36 are on the order of 6 mm and 3 mm, respectively, and may to therefore support the transmission and receipt of IO signals having a frequency of approximately 24 GHz or more. For example, the free-space wavelength is approximately 2.5 mm at 120 GHz. Thus, smaller signal wavelengths may allow antennas to be built into the housing of a relatively small electrical connector without significantly compromising the radiation efficiency and bandwidth. The radiation field 38 for such a configuration may be similar to that of an endfire antenna.

FIG. 5 shows an alternative configuration of a connector assembly 40 in which the antenna structure is integral to a printed circuit board (PCB) 42 adjacent to (e.g., below) a substrate 44 having IO contacts (not shown) disposed within the connector housing 46. In particular, the illustrated antenna structure includes an endfire antenna 48 with an endfire radiation field 50 as well as a broadside antenna 52 with a broadside radiation field 54. In this regard, the gain of omni-directional antennas may decrease at mm-wave frequencies. While a single directional antenna may provide only line-of-sight propagation at higher mm-wave frequencies, the illustrated approach enables the approximation of an omni-directional radiation field 56 in a general direction 59 due to the deployment of both the endfire and broadside antennas 48, 52 respectively. The illustrated connector assembly 40 also includes an optional interposer substrate 45 disposed between the PCB 42 and the substrate 44.

Figure 6:
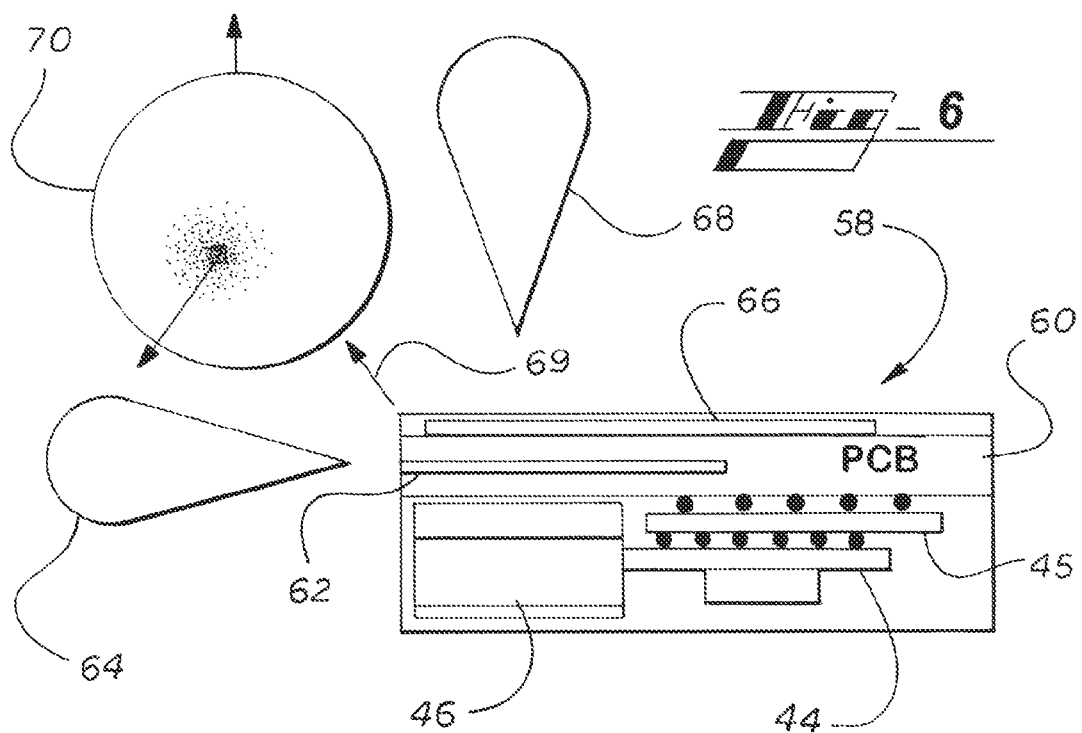
FIG. 6 is a side view of an example of an example of an antenna structure that is integral to a top-facing circuit board according to an embodiment.

FIG. 6 demonstrates that a connector assembly 58 could be constructed so that the antenna structure is integral to a PCB 60 positioned above the connector housing 46. Accordingly, an endfire antenna 62 may have an endfire radiation field 64, and a broadside antenna 66 may have a broadside radiation field 68, wherein the fields 64, 68 can combine to approximate an omni-directional field 70 in a general direction 69. In addition, combinations of vertically and horizontally polarized antennas may be used to achieve coverage in different directions.

Turning now to FIG. 7, a connector assembly 72 is shown in which a substrate 74 has multiple sets of IO contacts 76 (76a-76d) disposed within a shared metal housing 78. By stacking small connectors (e.g., horizontally) to create a larger block of multiple connectors (e.g., four in the example shown) adjacent to each other, the metal housing 78 (or interposer substrate, adjacent circuit board, etc.) could be used as an antenna that supports lower frequencies for each of the smaller connectors. For example, the configuration shown in combination with a host circuit board could provide sufficient volumetric area to support directional antenna frequencies of approximately 5.5 GHz to 2.4 GHz for Wideband USB (WUSB) type applications. In the illustrated example, each set of IO contacts 76 has a corresponding transceiver logic package 80 (80a-80d) to process the IO signals associated with the antenna structure as well as a respective set of IO contacts 76. The illustrated connector assembly 72 could also have multiple modes of operation including either simultaneous or time multiplexed operation of the wired and wireless connections.

FIGS. 8A and 8B show alternate approaches to implementing the transceiver (e.g., buffer) logic. In particular, FIG. 8A demonstrates that the transceiver logic may be implemented into a single semiconductor package 82. Thus, the single semiconductor package 82 approach could be used in situations where digital silicon technology is suitable for RF and mm-wave circuits. FIG. 8B demonstrates, on the other hand, that the transceiver logic could be partitioned into multiple semiconductor packages 84 (84a, 84b). In the example shown, the first semiconductor package 84a might be used to process wired IO signals and the second semiconductor package 84b might be used to process wireless IO signals for cases in which digital technology may not be suitable for the wireless application in question. In either instance, the transceiver logic may process the IO signals associated with the antenna structure simultaneously and separate from the IO signals associated with the set of IO contacts.

Another aspect of computing systems that may benefit from the techniques described herein relates to the authentication of peripheral devices. For example, an advantageous feature of wired connections may be their safety and ease of set-up relative to wireless connections (e.g., in comparison to the Bluetooth pairing process). The techniques described herein therefore enable an initial connection to be made to a peripheral device using a wired connection in order to download a connector key from the host platform into the peripheral device (or vice versa), wherein subsequent connections are wireless and subject to verification of the key.

For example, FIG. 9 shows a method 86 of authenticating a peripheral device. The method 86 may be implemented in a connector assembly as a set of logic instructions stored in a machine- or computer-readable storage medium such as random access memory (RAM), read only memory (ROM), programmable ROM (PROM), flash memory, etc., in configurable logic such as programmable logic arrays (PLAs), field programmable gate arrays (FPGAs), complex programmable logic devices (CPLDs), in fixed-functionality hardware using circuit technology such as application specific integrated circuit (ASIC), CMOS or transistor-transistor logic (TTL) technology, or any combination thereof. For example, computer program code to carry out operations shown in the method 86 may be written in any combination of one or more programming languages, including an object oriented programming language such as C++ or the like and conventional procedural programming languages, such as the "C" programming language or similar programming languages to achieve transceiver logic functionality. Moreover, the method 86 could be implemented as embedded transceiver logic using any of the aforementioned circuit technologies.

Processing block 88 provides for detecting a wired connection of a device to a set of IO contacts of a connector assembly. The wired connection could be with a disposable cable/pigtail to having the appropriate key shape to mate with the connector assembly. Illustrated block 90 provides for exchanging authentication (e.g., key) data with the device via the wired connection. As already noted, exchanging the authentication data could involve receiving a key from the device or transmitting a key to the device. Subsequently, a wireless connection of the device to the connector assembly may be detected at block 92. Illustrated block 94 provides for validating the device via the wireless connection based on the authentication data. Thus, if a key was previously transmitted to the device during a wired connection, block 94 might involve comparing a key received during the wireless connection with the previously transmitted key to determine if a match exists. If a key was previously received from the device during a wired connection, block 94 could involve comparing a key received during the wireless connection with a previously received key to determine if a match exists. If so, the device may be permitted to communicate with the connector assembly over the wireless link. If, on the other hand, there is no match, the validation process can disable the link between the connector assembly and the device.

Thus, the user may be provided the same ease of pairing and assurance that the connection is safe as for a wired connection, with the ease of use of wireless for connections after the initial connection. Simply put, pairing may be conducted only once, with the authentication key being subsequently used to eliminate any need for additional pairing.

Authentication could also be provided by a second peripheral device such as a wireless smart phone. In such an example, validation of the first peripheral device (whether a wired or wireless link is attempted for the first peripheral device) may be dependent upon detection of a wireless connection (e.g., pairing) between the connector assembly and the second peripheral device. If such a wireless connection is not detected, the communication link with the first peripheral device can be disabled.

Placing the wireless capability within the wired connection point can also have platform level advantages. For example, the platform architecture need not be changed to support the wireless I/O connection. Furthermore, computing system manufacturers can offer the combination connector as a purchase time option that doesn't lead to an additional board offering from the manufacturers. In addition, since the connection to the platform can be through the same internal platform IO connection and host controller, the IO software stack need not be modified to operate the wireless IO transceiver logic.

The techniques described herein may also facilitate synergistic use of common circuit blocks between wired and wireless connection modules. Additionally, both low speed and high speed wireless modes may be supported while maximizing backward compatibility. For example, the wireless transceiver logic may be configured to process IO signals over a wireless to link that goes through the wired IO contacts (e.g., legacy device is connected that operates using an add-on wireless module.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:
1. A system comprising:
a circuit board;
a chipset component coupled to the circuit board; and
a connector assembly coupled to the circuit board, the connector assembly including a substrate, a set of input/output (IO) contacts, an antenna structure, and transceiver logic to, process one or more IO signals associated with the antenna structure, and process one or more IO signals associated with the set of IO contacts, wherein the connector assembly further includes a first package having first transceiver logic to process one or more wired IO signals, and a second package having second transceiver logic to process one or more wireless IO signals.

2. The system of claim 1, wherein the antenna structure includes a metal housing and the set of IO contacts is disposed within the metal housing.

3. The system of claim 2, wherein the substrate includes multiple sets of IO contacts disposed within the metal housing and the transceiver logic is to process one or more wireless IO signals having a frequency greater than approximately 2.4 GHz.

4. The system of claim 1, wherein the antenna structure is integral to the substrate.

5. The system of claim 1, wherein the antenna structure is integral to the circuit board and adjacent to the substrate.

6. The system of claim 5, wherein the antenna structure includes at least one of an endfire antenna, and a broadside antenna.

7. The system of claim 1, wherein the first package and the second package are coupled to the substrate.

8. The system of claim 1, wherein the transceiver logic is to,
detect a wired connection of a device to the set of IO contacts, and
exchange authentication data with the device via the wired connection.

9. The system of claim 8, wherein the transceiver logic is to,
detect a wireless connection of the device to the connector assembly, and
validate the device via the wireless connection based on the authentication data.

10. The system of claim 1, wherein the transceiver logic is to process one or more IO signals having a frequency greater than approximately 60 GHz.

11. The system of claim 1, wherein the transceiver logic is to process the one or more IO signals associated with the antenna structure simultaneously and separate from the one or more IO signals associated with the set of IO contacts.

12. A connector assembly comprising:
a substrate having a set of input/output (IO) contacts;
an antenna structure; and
transceiver logic to,
process one or more IO signals associated with the antenna structure, and
process one or more IO signals associated with the set of IO contacts,
wherein the connector assembly further includes a first package having first transceiver logic to process one or more wired IO signals, and a second package having second transceiver logic to process one or more wireless IO signals.

13. The connector assembly of claim 12, wherein the antenna structure includes a metal housing and the set of IO contacts is disposed within the metal housing.

14. The connector assembly of claim 13, wherein the substrate includes multiple sets of IO contacts disposed within the metal housing and the transceiver logic is to process one or more wireless IO signals having a frequency greater than approximately 2.4 GHz.

15. The connector assembly of claim 12, wherein the antenna structure is integral to the substrate.

16. The connector assembly of claim 12, further including a circuit board coupled to the substrate, wherein the antenna structure is integral to the circuit board and adjacent to the substrate.

17. The connector assembly of claim 16, wherein the antenna structure includes at least one of an endfire antenna, and a broadside antenna.

18. The connector assembly of claim 12, wherein the first package and the second package are coupled to the substrate.

19. The connector assembly of claim 12, wherein the transceiver logic is to,
detect a wired connection of a device to the set of IO contacts, and
exchange authentication data with the device via the wired connection.

20. The connector assembly of claim 19, wherein the transceiver logic is to,
detect a wireless connection of the device to the connector assembly, and
validate the device via the wireless connection based on the authentication data.

21. The connector assembly of claim 12, wherein the transceiver logic is to process one or more IO signals having a frequency greater than approximately 60 GHz.

22. The connector assembly of claim 12, wherein the transceiver logic is to process the one or more IO signals associated with the antenna structure simultaneously and separate from the one or more IO signals associated with the set of IO contacts.

23. A computer implemented method comprising:
processing one or more input/output (IO) signals associated with an antenna structure of a connector assembly; and
processing one or more IO signals associated with a set of IO contacts of the connector assembly,
wherein the connector assembly further includes a first package having first transceiver logic to process one or more wired IO signals, and a second package having second transceiver logic to process one or more wireless IO signals.

24. The method of claim 23, further including:
detecting a wired connection of a device to the set of IO contacts; and
exchanging authentication data with the device via the wired connection.

25. The method of claim 24, further including:
detecting a wireless connection of the device to the connector assembly; and
validating the device via the wireless connection based on the authentication data.

26. The method of claim 24, wherein exchanging the authentication data includes receiving a key from the device via the wired connection.

27. The method of claim 24, wherein exchanging the authentication data includes transmitting a key to the device via the wired connection.

28. The method of claim 23, further including:
detecting a connection of a first peripheral device to the connector assembly; and
validating the first peripheral device if a wireless connection is detected between the connector assembly and a second peripheral device.

29. The method of claim 23, wherein the one or more IO signals associated with the antenna structure are processed simultaneously and separate from the one or more IO signals associated with the set of IO contacts.

30. A non-transitory computer readable storage medium comprising a set of instructions which, if executed by a processor, causes a connector assembly to:
  process one or more input/output (IO) signals associated with an antenna structure of the connector assembly; and
  process one or more IO signals associated with a set of IO contacts of the connector assembly,
  wherein the connector assembly further includes a first package having first transceiver logic to process one or more wired IO signals, and a second package having second transceiver logic to process one or more wireless IO signals.

31. The medium of claim 30, wherein the instructions, if executed, cause the connector assembly to:
  detect a wired connection of a device to the set of IO contacts; and
  exchange authentication data with the device via the wired connection.

32. The medium of claim 31, wherein the instructions, if executed, cause the connector assembly to:
  detect a wireless connection of the device to the connector assembly; and
  validate the device via the wireless connection based on the authentication data.

33. The medium of claim 31, wherein the instructions, if executed, cause the connector assembly to receive a key from the device via the wired connection.

34. The medium of claim 31, wherein the instructions, if executed, cause the connector assembly to transmit a key to the device via the wired connection.

35. The medium of claim 31, wherein the instructions, if executed, cause the connector assembly to:
  detect a connection of a first peripheral device to the connector assembly; and
  validate the first peripheral device if a wireless connection is detected between the connector assembly and a second peripheral device.

36. The medium of claim 31, wherein the one or more IO signals associated with the antenna structure are to be processed simultaneously and separate from the one or more IO signals associated with the set of IO contacts.

* * * * *